(12) United States Patent
Emerson

(10) Patent No.: US 7,980,873 B2
(45) Date of Patent: Jul. 19, 2011

(54) ELECTRICAL CONNECTOR FOR INSULATED CONDUCTIVE WIRES ENCAPSULATED IN PROTECTIVE TUBING

(76) Inventor: Tod D. Emerson, Cypress, TX (US)

(*) Notice: Subject to any disclaimer, the term of this patent is extended or adjusted under 35 U.S.C. 154(b) by 144 days.

(21) Appl. No.: 11/830,206

(22) Filed: Jul. 30, 2007

(65) Prior Publication Data

US 2008/0026623 A1   Jan. 31, 2008

Related U.S. Application Data

(60) Provisional application No. 60/833,880, filed on Jul. 28, 2006.

(51) Int. Cl.
  *H01R 4/60* (2006.01)
(52) U.S. Cl. .............. 439/191; 439/281; 174/84 R
(58) Field of Classification Search ............... 439/587, 439/281, 191–192, 194–195; 174/84 R, 174/84 C, 88 R, 93
See application file for complete search history.

(56) References Cited

U.S. PATENT DOCUMENTS

| | | | |
|---|---|---|---|
| 3,378,811 A * | 4/1968 | Cullen et al. ............... 439/390 |
| 3,576,334 A * | 4/1971 | Hemens .................... 285/222.4 |
| 4,422,504 A | 12/1983 | Moore |
| 4,523,645 A | 6/1985 | Moore |
| 4,611,656 A | 9/1986 | Kendall, Jr. et al. |
| 4,627,490 A | 12/1986 | Moore |
| 4,781,607 A | 11/1988 | Rumbaugh |
| 4,859,200 A | 8/1989 | McIntosh et al. |
| 4,921,438 A | 5/1990 | Godfrey et al. |
| 4,927,386 A | 5/1990 | Neuroth |
| 5,122,209 A | 6/1992 | Moore et al. |
| 5,289,882 A | 3/1994 | Moore |
| 5,478,970 A | 12/1995 | Lawler et al. |
| 5,495,755 A | 3/1996 | Moore |
| 5,567,170 A | 10/1996 | Kroeber |
| 5,577,925 A | 11/1996 | Schnatzmeyer et al. |
| 5,626,190 A | 5/1997 | Moore |
| 5,642,780 A | 7/1997 | Moore |
| 5,667,008 A | 9/1997 | Moore |
| 5,667,009 A | 9/1997 | Moore |
| 5,670,747 A | 9/1997 | Lawer et al. |
| 5,732,771 A | 3/1998 | Moore |
| 5,762,135 A | 6/1998 | Moore |
| 5,823,256 A | 10/1998 | Moore |
| 5,907,966 A | 6/1999 | Moore |
| 5,974,848 A | 11/1999 | Moore |
| RE36,833 E | 8/2000 | Moore et al. |
| 6,148,925 A | 11/2000 | Moore |
| 6,202,743 B1 | 3/2001 | Moore |
| 6,409,485 B1 * | 6/2002 | Ebner ..................... 417/423.1 |
| 6,443,780 B2 | 9/2002 | Wilbourn et al. |

(Continued)

OTHER PUBLICATIONS

International Search Report issued Mar. 15, 2008 during the prosecution of International Application No. PCT/US2007/074674.

(Continued)

*Primary Examiner* — Xuong M Chung Trans

(57) ABSTRACT

A connector for electrically and mechanically connecting insulated conductor wires encapsulated in protective tubing. Embodiments of the connector provide a protective outer sheathing that circumscribes the conductive and insulating structures within the connector. The connector is formed with a plurality of tubular fitting assemblies for securely attaching the connector to down hole electrical power cables. The connector is also formed with an internal insulating boot having an internal passage adapted to surround the conductive elements of the connector to provide a reliable down hole electrical connector.

8 Claims, 12 Drawing Sheets

U.S. PATENT DOCUMENTS

| | | | |
|---|---|---|---|
| 6,676,447 B1 | 1/2004 | Knox | |
| 6,910,870 B2 * | 6/2005 | Ebner | 417/422 |
| 6,943,298 B2 | 9/2005 | Nicholson et al. | |
| 7,019,217 B2 * | 3/2006 | Bryant | 174/88 R |
| 7,232,347 B1 | 6/2007 | Moore | |
| 7,325,596 B2 * | 2/2008 | Ebner | 166/65.1 |
| 7,405,358 B2 * | 7/2008 | Emerson | 174/88 R |
| 2002/0013093 A1 | 1/2002 | Wilbourn et al. | |
| 2004/0120837 A1 | 6/2004 | Ebner | |

OTHER PUBLICATIONS

Written Opinion issued Mar. 15, 2008 during the prosecution of International Application No. PCT/US2007/074674.

International Preliminary Report on Patentability issued Feb. 3, 2009 during the prosecution of International Application No. PCT/US2007/074674.

* cited by examiner

ELECTRICAL CONNECTOR FOR INSULATED CONDUCTIVE WIRES ENCAPSULATED IN PROTECTIVE TUBING

CROSS-REFERENCE TO RELATED APPLICATIONS

This application claims the benefit of U.S. Provisional Application Ser. No. 60/833,880 filed Jul. 28, 2006, the contents of which is hereby incorporated by reference in its entirety.

TECHNICAL FIELD

The present invention relates to an electrical power cable connector sealing method and assembly for an underground well and, more particularly, to a unique, efficient sealed electrical connector assembly for coupling the conductive wires of a motor lead extension cable with the conductive wires of other power cables.

BACKGROUND OF THE INVENTION

Substantial difficulty has heretofore been encountered in providing a sealed electrical connection between a motor lead extension cable and other types of power cables. Particular difficulty has also arisen in maintaining a durable electrical connector that is resistant to the harsh down hole environments often responsible for causing electrical failures between surface power sources and down hole equipment, such as electrical submersible pumps.

An electrical submersible pump, or ESP, provides artificial lift essential to increasing the flow of fluid to the surface of a production oil well. An electrical submersible pump is a pump with a hermetically sealed motor coupled to the pump body. Typically, the electrical submersible pump assembly is submerged in the fluid being pumped and requires a special power cable known as a motor lead extension cable, or MLE, for supplying power. The motor lead extension cable usually attaches to a pothead flange, which will mechanically fasten to the pump's motor.

Electrical power from the surface is typically brought from a remote source into the well through a wellhead barrier via a power cable. Inside the well another power cable, known as a main power cable, extends from the wellhead penetrator to the down hole electrical submersible pump. The motor lead extension cable connects with the main power cable and extends further down hole adjacent to the electrical submersible pump to the pump's power receptacle.

In currently known applications, the upper end of the motor lead extension cable is spliced to the main power cable. The lower end of the motor lead extension cable, fitted with a pothead flange, is plugged into the pump's power receptacle and mechanically affixed using cap screws.

In currently known applications, main power cables and motor lead extension cables typically include three conductive wires housed within various protective materials such as armored cladding, insulation or jacketing. The problem, however, with conventional main cables and motor lead extension cables is that very harsh down hole conditions, such as high hydrogen sulfide and high temperature environments, cause the cable's protective housings to breakdown, often causing electrical failure.

To protect against harsh down hole conditions, motor lead extension cables are typically surrounded with protective tubing. That is, each of the three conductive wires of the motor lead extension cable are encapsulated in an individual protective tube. The tube is typically constructed of stainless steel or metal alloy, which protects the conductive wires and prevents them from coming in contact with well fluids.

The protective tubing on the motor lead extension cables is typically limited to approximately 200 feet in length. With the operating depth of electrical submersible pumps normally greater than 4,000 feet, motor lead extension cables often need to be connected directly or indirectly to the main power cable in order to connect the electrical submersible pump with the surface power source.

Presently, drilling operators typically employ a tape wrap splice to connect down hole equipment with surface power, which involves crimping the conductive wires of two adjacent power cables together with an electrical crimp and then wrapping the crimp and a portion of each cable with nonconductive electrical tape. That is, each of the individual three phase conductor wires of the motor lead extension cable are typically crimped to the respective three phase conductor wires of the main power cable and wrapped with nonconductive adhesive materials for protection. Significant problems with the tape wrap splice connection include the lack of durability of the nonconductive tape and the connectors inability to hold up under corrosive conditions in the well. Such splice, connections therefore, are not always reliable and often fail, resulting in a delay or a total drilling stoppage at substantial expense to the operator.

The present invention overcomes the problems of the tape wrap spice by providing durable field attachable electrical connector that is resistant to harsh environments and not subject to breakdown. Embodiments of the present invention also overcome the aforementioned problems by providing a reusable and/or permanent connector. Further embodiments of the present invention provide a sealed connector that is completely impervious to well fluids.

SUMMARY OF THE INVENTION

In a preferred embodiment of the present invention, the connector provides an electrical and mechanical connection for insulated conductor wires. The connector preferably includes a first connector formed with an internal passage and a tube fitting assembly, the internal passage and tube fitting assembly are preferably adapted to selectively engage an insulated conductive wire in protective tubing and the first connector preferably exhibits an elongated longitudinal dimension. The first connector is adapted to mate with second connector, which is similarly formed. Also included in the connector is a protective rigid outer sheath formed with a hollow tubular chamber that is sized and shaped to slidably receive and engage the first and second connector assemblies so that the first and second connector assemblies are longitudinally aligned within the tubular chamber. Conductive wires become encapsulated within the rigid protective tubing in order ensure power is supplied to down hole equipment operating within a well bore. The the rigid tubing of the conductive wires are engaged by the fitting assemblies of the first or second connector. The rigid tubing is preferably sized and shaped to form a continuous protective layer extending from the fitting assembly to engaging portions of the motor. A conductive wire also preferably forms a continuous conductive medium extending from conductive portions of the connector to conductive portions of the motor.

The tube fitting assembly of the first and second connectors also preferably comprise an integrally formed longitudinal protrusion having a hollow passage and threaded external surface. The hollow passage is adapted to mate with a compression nut having a complementary threaded internal surface and adjacent ring-shaped ferrule. The compression nut is adapted to tighten to the threaded protrusion so that the ferrule is compressed and slightly deformed against the rigid tubing to form a fluid tight seal.

The tube fitting assembly preferably includes an elongated opening sized and shaped to fit around the rigid tube. The tube fitting assembly also preferably includes at least two threaded holes that the protective rigid outer sheath can be fastened to. The opening preferably includes a longitudinal counter bored section for receiving the rigid tubing and at least one ring shaped bushing for engaging the rigid tubing. The threaded holes are preferably adapted to receive a fastening screw so that the protective rigid outer sheath can be tightly attached to the tube fitting assembly.

In alternative embodiments, the connector couples with a conductive wire that extends directly from an electrical submersible pump. Other embodiments directly connect a conductive wire from a motor lead extension cable. In still further embodiments, the connector has protective sheathing that not rigid.

In another preferred embodiment, the connector includes an end cap formed with a hollowed body portion adapted with a tubular fitting assembly and an open end. The tubular body is specifically formed with a threaded portion proximate the open end. The threaded portion may be on the end cap's internal or external surface. The connector also preferably includes a tubular body formed with an open end and a hollowed outer sleeve that exhibits an elongated lateral dimension. The outer sleeve is preferably formed with a threaded portion proximate the open and a tubular fitting assembly at the opposite end. The threaded portion may be on the outer sleeve's internal or external surface. The threaded portion of the tubular body is specially adapted to mate with the threaded surface of the end cap.

In another preferred embodiment, the tubular fitting assemblies of the end cap and the tubular body comprise an integrally formed longitudinally protruding portion that has a hollow passage and threaded external surface, the threaded extension being adapted to mate with a compression nut having a complementary threaded internal surface for compression of a ring-shaped ferrule. The compression nut is preferably adapted to selectively rotate to form a fluid tight seal between the rigid tubing and the tube fitting assembly.

In another preferred embodiment, the threaded portion of the end cap is formed on the internal surface of the end cap. Accordingly, the threaded portion of the tubular body is formed on the outer surface of the tubular body. In an alternative embodiment, the tubular body exhibits a greater lateral diameter than the end cap. Accordingly, the threaded portion of the tubular body is preferably formed on the internal surface of the tubular body, and the threaded portion of the end cap is formed the outer surface of the end cap. However, the connector may also be formed so that the end cap exhibits a greater lateral length than the tubular body.

The tubular body and end cap may also be formed with a plurality of flat faces and/or a relatively smooth surface adapted to be gripped by a pipe wrench.

In a further embodiment, the connector comprises an elastomeric insulating boot formed with an internal passage for receiving and supporting electrically conductive structures. In this embodiment, the insulating boot preferably exhibits an elongated lateral dimension, and is adapted to be compressed to exhibit increased rigidity for supporting the conductive structures. Also included, are a conductive wire connector for electrically and mechanically connecting a first and second insulated conductive wire. The wire connector is preferably formed to have an elongated lateral dimension and a first and second recessed portion having a relatively flat top annular surface. The first recessed portion is preferably adapted to receive and engage a first conductive wire and the second recessed portion adapted to receive and engage a second conductive wire so that an electrical connection is formed between a first and second conductive wires and the insulation of each conductive wire is positioned adjacent to the annular surfaces of the wire connector. An outer sheath is specially formed to have a hollow internal chamber sized and shaped to encapsulate the insulating boot so that it can selectively reduce the volume of its internal chamber to compress insulating boot when rotated.

The foregoing has outlined the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
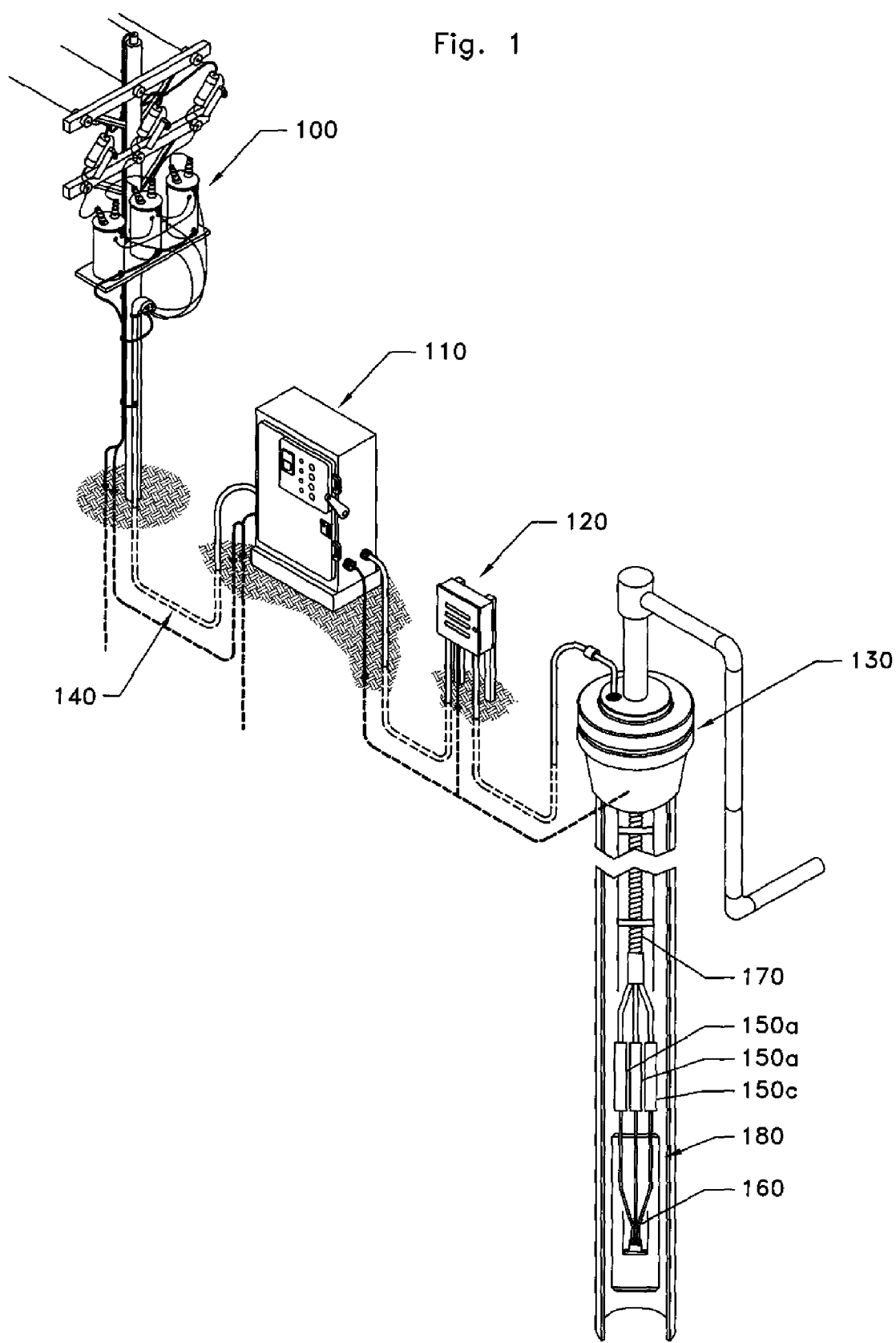
FIG. 1 shows a surface power source connected with an example embodiment connector of the present invention.

FIG. 1 illustrates a preferred embodiment in which a remote surface power source 100 provides electrical power to down hole electrical equipment 180. The remote power source 100 is preferably a transformer bank, positioned on a power pole, which supplies power via cable 140 to motor control panel 110. Power cable 140 is typically formed of a medium voltage electrical conductor cable that runs from the motor control panel 110 in a known way to a vented junction box 120, and then into a wellhead barrier 130 of an underground well. Inside the well, a main power cable 170 extends from below the wellhead barrier 130 to a position proximate the down hole electrical equipment 180, where it connects with a motor lead extension cable 160. As further described below, preferred and alternative embodiments of the present invention, connectors 150a, 150b, and 150c (referred to generally as connector 150) provide the means for connecting the main power cable 160 and the motor lead extension cable 160. Connectors 150a, 150b, 150c, also provide the means for connecting separate lengths of other types of down hole electrical cables.

Figure 2A:
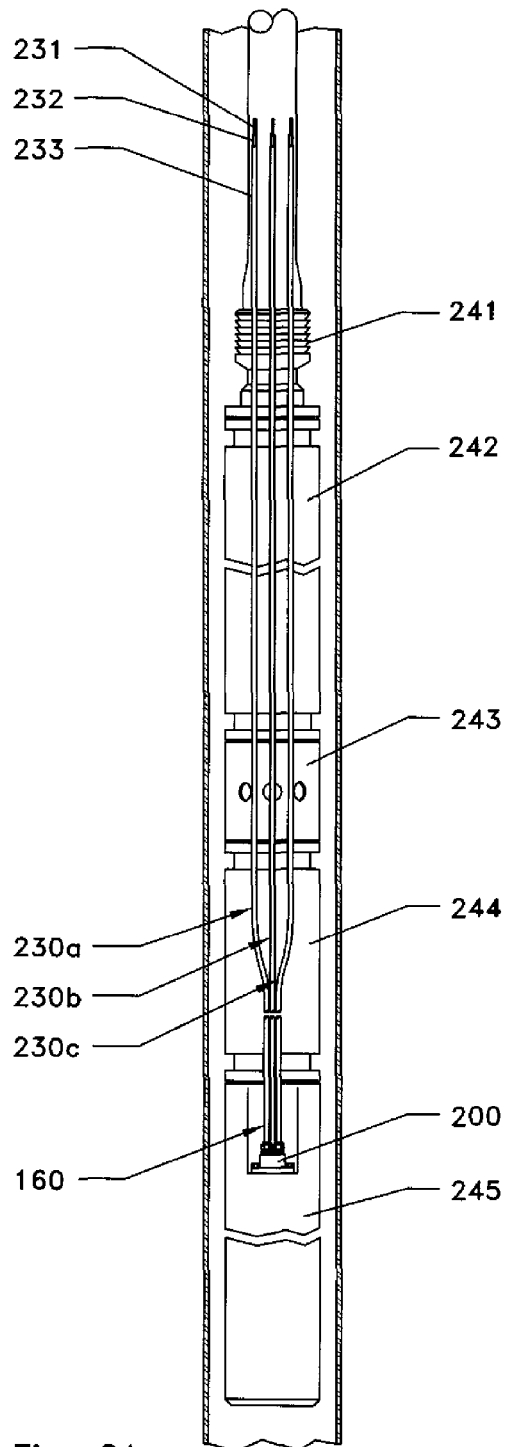
FIGS. 2A-2B show example motor lead extension cable assemblies and electrical submersible pump assemblies known in the art.

The motor lead extension cable 160, shown in a frontal view in FIG. 2A, is fitted with a pothead flange 200 and connected to the electric motor 245 of an electrical submersible pump assembly 240. The motor lead extension cable 160 preferably includes three insulated conductive wires in protective tubing 230a, 230b, and 230c (each generally referred to herein with reference numeral 230). Each of the three insulated conductive wires in protective tubing 230 preferably comprise a conductor wire 231, formed of copper or other electrically conductive material, which is surrounded with an insulation 232 layer formed of a dielectric (e.g., nonconductive) material. Tubing 233 encapsulates each conductor wire 231 and its surrounding insulation 232. Tubing 233 is preferably formed of stainless steel or metal alloy.

Figure 2B:
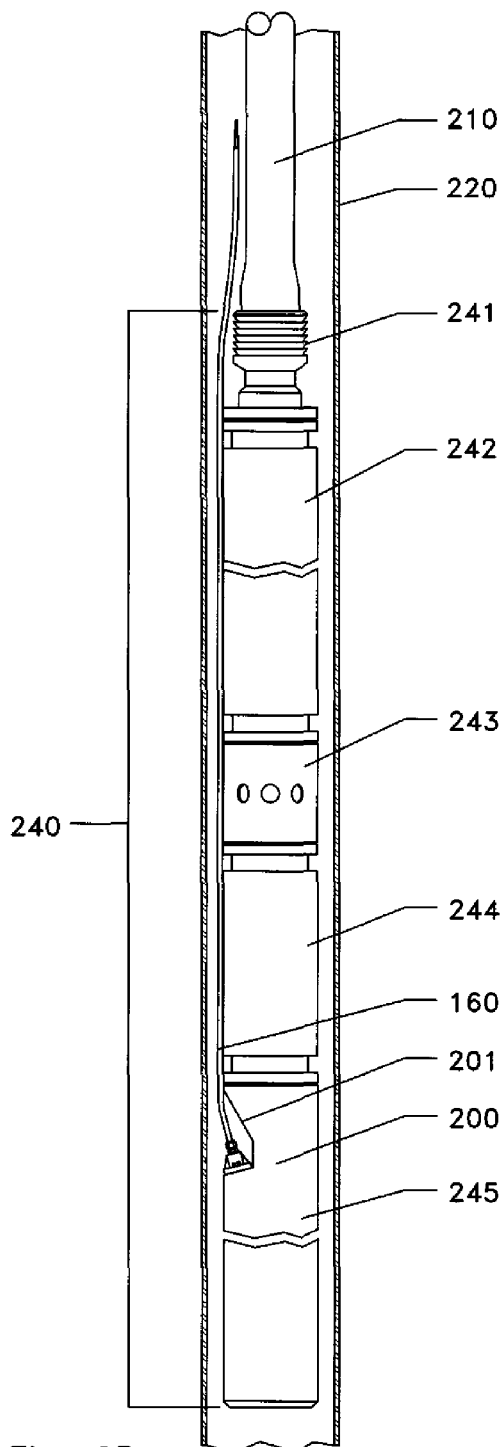

FIG. 2B shows a side perspective of the electrical submersible pump assembly 240 and the motor lead extension cable 160. Typically, the entire electrical submersible pump assembly 240 is lowered to varying depths in the well hole. For example, the pump assembly 240 is preferably lowered to depths ranging from 1,000 to 15,000 feet, however, there is no practical maximum depth at which the electrical submersible pump assembly 240 can be used.

The main power cable 170 (see FIG. 1) typically extends down a substantial portion of the well hole to the operating depth. Close to the operating depth, the main power cable 170 connects with the motor lead extension cable 160 which then mechanically and electrically connects with the electric motor 245. The main power cable 140 is typically banded (not shown) to production tubing 210 in a known way as it extends down the drill casing 220. The motor lead extension cable 160 is banded (not shown) to the electrical submersible pump assembly 240 in a known way and, in some operations, is also banded to portions of the production tubing 210. The motor lead extension cable 160 may be banded to the pump assembly 240 at or near the discharge head 241, the pump 242 itself, the intake 243, the seal section 244, or the electric motor 245. The bottom portion of the motor lead extension cable is fitted with a pothead flange 200, which typically plugs a power receptacle within a recess 201 of electric motor 245.

Various types of pothead flanges 200a, 200b, 200c or 200d (referred to generally herein as pothead 200) are shown in FIGS. 3A, 3B, 3C, and 3D. Pothead flanges are typically adapted for attaching to motor lead extension cables 160 with three insulated conductive wires encapsulated in protective tubing 230a, 230b, and 203c. However, one of skill in the art will appreciate that different motor lead extension cables 160 exist and may comprise one, two, three or more wires. Further, it will be appreciated that such cable arrangements may be utilized in embodiments of the present invention. For example, the single insulated conductive wire arrangement may be used to connect instrumentation wires or cathodic protection wires and connected with extension power cables by connector 150.

Pothead 200 attaches to various types of protective tubing. In the preferred embodiment, pothead 200 attaches to insulated conductive wires with protective tubing made of stainless steel or metal alloy formed with a ⅜ inch diameter.

Figures 3A, 3B, 3C, 3D:
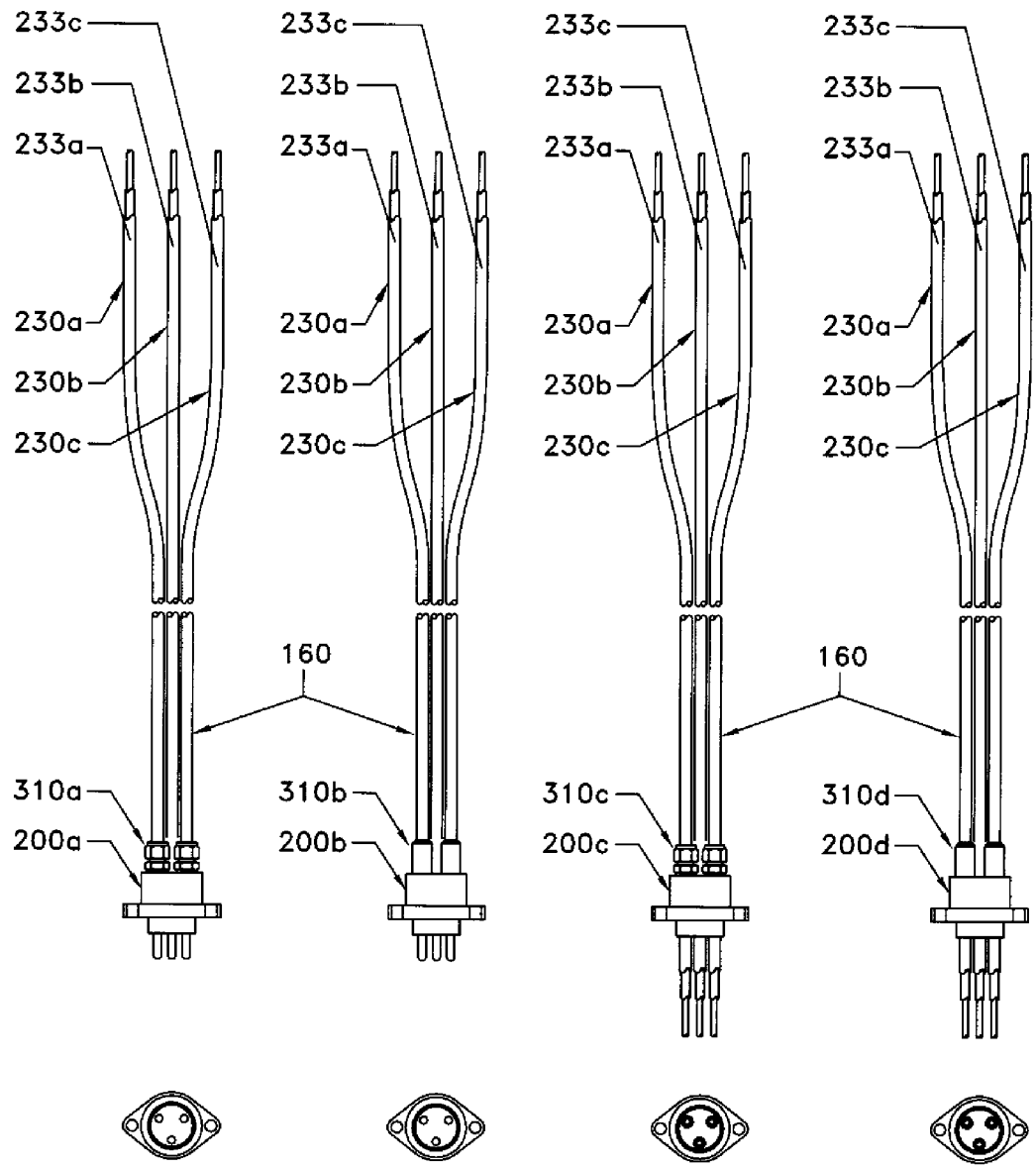
FIGS. 3A-3D show example known pothead flange assemblies coupled with motor lead extension cables.

Compression fittings 310a and 310c, preferably from Swagelok®, attach the pothead 200 directly to the tubing 233 in order to provide a sealed mechanical connection. In FIGS. 3A and 3C, pothead flanges 200a and 200c are attached by Swagelok® fittings 310a and 310c with tubings 233a, 233b, 233c. In an alternative embodiment, a weld attaches pothead 200 with tubings 233a, 233b, and 233c. FIGS. 3B and 3D show pothead flanges 200b and 200d attached with tubings 230a, 230b, and 230c by socket welds 310b and 310d.

Because conventional varieties of motor lead extension cables 160 range from approximately fifty to seventy five feet in length, there is a limit on how for down the well hole power can be supplied without using a power extension cable. Drilling operators, however, require power at great depths in the well hole. Preferred embodiments of the present invention therefore provide connectors 150 for reliably connecting separate lengths of down hole power cables supply power at any operating depth.

Figure 4A:
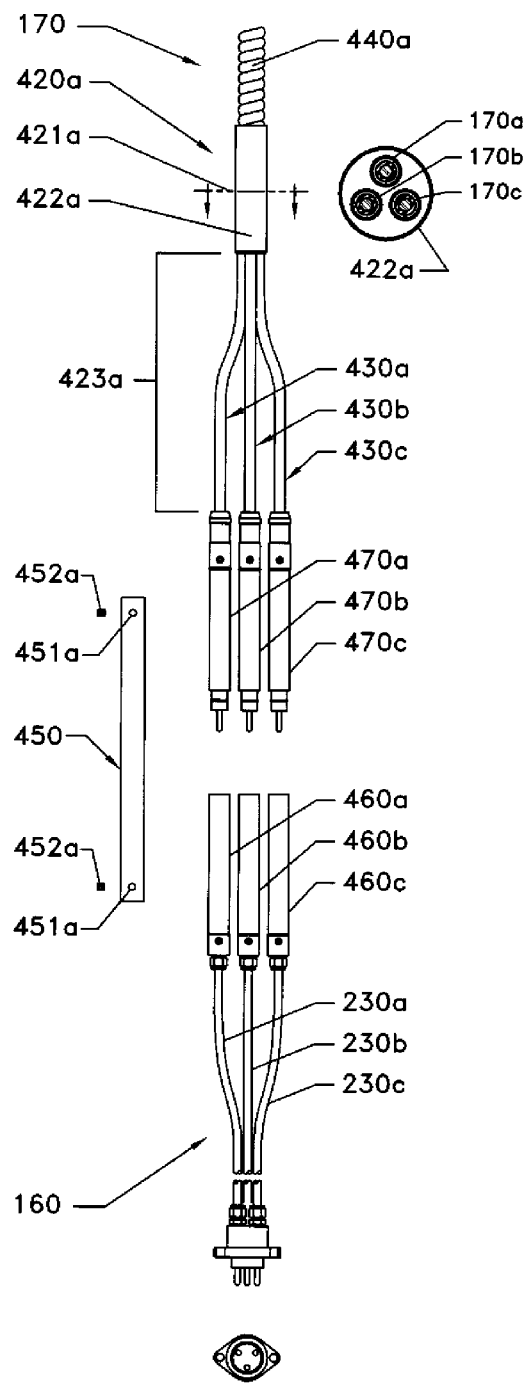
FIGS. 4A and 4B shows example embodiments of male connector assemblies attached to a main power cable and example embodiment female connector assemblies attached to a motor lead extension cable.
Figure 4B:
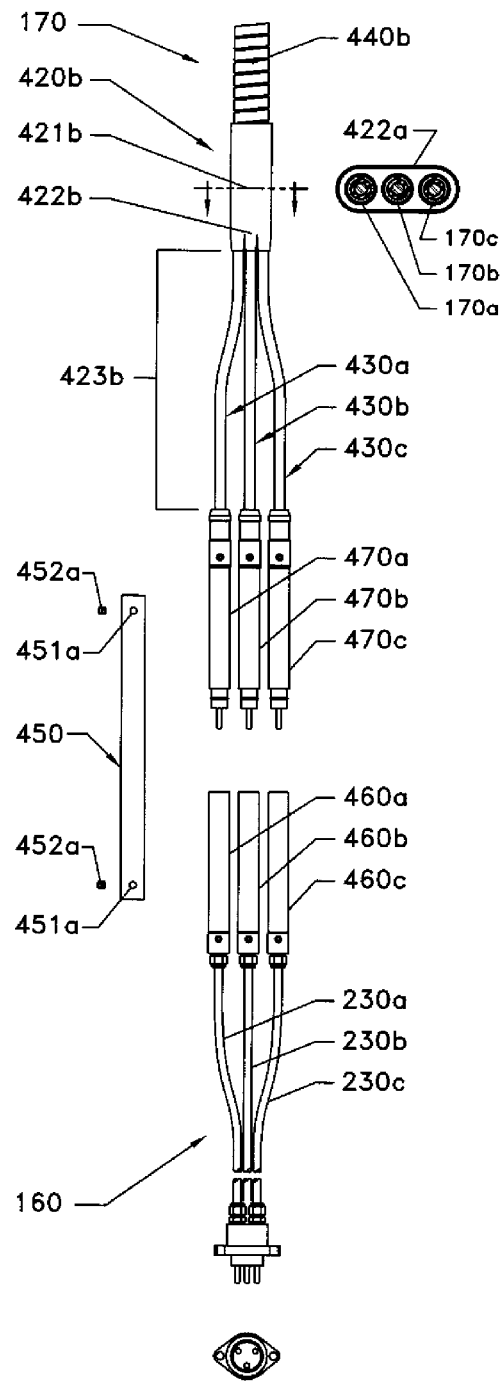

FIGS. 4A and FIG. 4B shows the preferred embodiment of the present invention in which connectors 150 are adapted to connect a main power cable 170 with a motor lead extension cable 160. Triskelion 420 referring generally to 420a and 420b provides a protected transition for the insulated conductor wires 170a, 170b, and 170c as they protrude from main power cable 170 and enter the respective male connector assemblies 470a, 470b, and 470c. The male connector assemblies 470a, 470b, 470c (referred to generally herein as male connector assembly 470) are shown unplugged from the corresponding female connector assemblies 460a, 460b, and 460c (referred to generally as female assembly 460), and one of the three protective outer sheaths 450 is shown adjacent to male and female assemblies 460 and 470 with its screws 452a removed from holes 451a. It will be understood that male and female assemblies plug together (see FIG. 5) and are covered by protective outer sheath 450 to provide an electrical and mechanical connection.

Main power cable 170 preferably comprises three insulated conductive wires 170a, 170b, and 170c electrically connected to the surface power source 100 (See FIG. 1). As shown in FIG. 4A, main power cable 170 also preferably formed to so that the insulated conductive wires 170a, 170b, 170c and protective jacketing 440a exhibit a round lateral dimension, as shown in the cross sectional view. Alternatively, as shown in FIG. 4B main power cable 170 may be formed to exhibit a flat or generally rectangular lateral dimension in the cross sectional view. In the flat main power cable 170 arrangement, the insulated conductive wires 170a, 170b, 170c are positioned in a row. Analogous parts of FIGS. 4A and 4B are indicated using identical reference numerals.

Both round and flat main power cable 170 preferably comprise insulated conductive wires 170a, 170b, 170c which are grouped together within protective jacketing 440a or 440b to form a unitary structure. Cross sectional view in FIGS. 4A and 4B illustrate the unitary structure of the conductive wires 170a, 170b, 170c. Protective jacketing 440a and 440b (referred to generally as protective jacketing 440) is comprised of corrugated steel armor, or any other material that is impervious to the harsh down hole environment. Main power cable 170 and protective jacketing 440 preferably extend from the wellhead barrier (See FIG. 1) all the way down the bore hole to protect the three insulated conductive wires 170a, 170b, 170c. Main power cable 170 terminates proximate the electrical submersible pump assembly (see FIG. 1) creating an end portion of the main power cable. Near the end portion, a desired length of protective jacketing 440 is trimmed to expose the insulated conductive wires 170a, 170b, 171c. The exposed portions of the insulated conductive wires 170a, 170b, and 170c that protrude from the protective jacketing 440 are fitted with triskelion 420 to cover the exposed insulated conductive wires.

FIG. 4A shows the triskelion 420a, which is adapted for receiving insulated conductive wires 170a, 170b, and 170c of round main power cable 170, or any other power cable in which the conductive wires are aligned to form a round cable. FIG. 4B shows an alternative triskelion 420b in which the conductive wires are preferably aligned side-by-side to form a flat cable. One advantage of triskelion 420b is its narrow profile.

Triskelions 420a and 420b are preferably formed from a non-ferromagnetic electrically conductive material, such as nickel-plated brass or stainless steel, for example, although other similar materials may be used. Analogous parts of triskelion 420a and 420b are indicated using identical reference numerals.

Triskelions 420, such as the one described in U.S. Pat. No. 5,823,256, Boyd B. Moore (see FIGS. 14A and 15A or the '256 patent), hereby incorporated by reference in its entirety, surrounds and protects the exposed portion of the insulated conductive wires 170a, 170b, and 170c. Triskelions 420 also prevents sudden expansion of the conductive wires' insulation 232 during decompression when, for example, the down hole pump is turned on, or when the casing annulus pressure is bled off, where the insulation would otherwise expand and possibly break causing electrical failure.

Triskelions 420a and 420b function to transition and protect the insulated conductive wires of three phase power cable into connector 150. Transition of the main power cable's 170 unitary insulated conductive wires begins where the insulated conductive wires 170a, 170b, 170c protrude from the protective jacketing 440a and 440b of main power cable 170. That is, inside the protective jacketing 440a and 440b the insulated conductive wires 170a, 170b, 170c are formed as a single unit which remains intact as they enter the triskelions 420a, 420b. At or near the mid-point 421a, 421b of triskelions 420a and 420b within a single, larger protective top sheath 422a, 422b, the wires 170a, 170b, 170c are separated slightly and surrounded with the protective tubing of the legs portions 423a, 423b.

As shown in FIGS. 4A and 4B, below the protective top sheaths 422a, 422b leg sheathing 430a, 430b, and 430c encapsulate the respective insulated conductive wires 171a, 171b, 171c with protective tubing all the way to the male connector assemblies 470a, 470b, 470c. Triskelions 420a and 420b, therefore, cover the end portion of main power cable 170 with a protective top sheath 422a, 422b and cover the insulated conductive wires 171a, 171b, 171c with leg sheathing 430a, 430b and 430c. Triskelion 420 also, therefore, separates each individual conductive wire as they protrude from the main power cable 170 thereby providing a protective transition between the main power cable's 170 unitarily formed three conductive wire arrangement and the three separately spaced male connectors 470a, 470b, 470c.

To create an electrical and mechanical connection, the male connector assemblies 470a, 470b, 470c plug into the female connector assemblies 460a, 460b, and 460c, and each of the connections is covered with protective outer sheath 450 (See FIG. 5) that is fastened, preferably with screws 452a, to the male and female connector assemblies 470, 460 through holes 452a. As shown in FIGS. 4A and 4B, the female connector assemblies 460a, 460b, and 460c attach to an insulated conductive wires in protective tubing 230a, 230b, 230c from the motor lead extension cable 160 and are adapted to selectively receive the end portion of the corresponding male connector assembly. It is understood that male and female assemblies 470, 460 can be reversed so that the male assembly 470 attaches to the motor lead extension cable 160 and the female assembly attaches 460 attaches to the main power cable 170.

Figure 5:
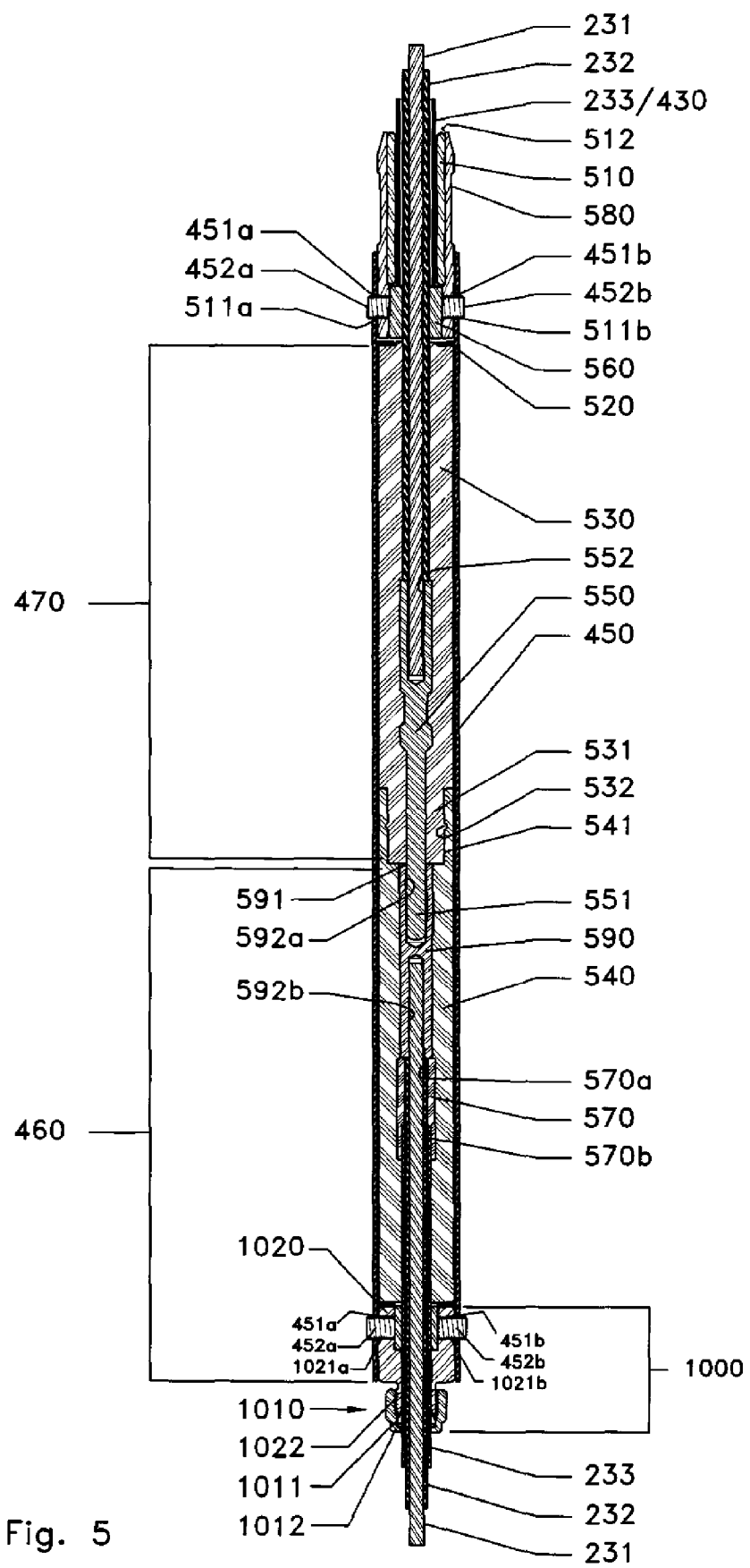
FIG. 5 shows a sectional view of an example embodiment of a male and female connector assembly.

Referring now to the male connector assembly 470 shown in FIG. 5, rigid tubing 233 is inserted and passes through a top stop 510. Top stop 510 is preferably made of a non-ferromagnetic, electrically conductive material, such as stainless steel, for example. Top stop 510 includes an opening or counter bore 512 for terminating tubing 233 or protective leg sheathing 430. Protective sheath 430 or tubing 230 fits reasonably tight into counter bore 512 to create a gripping frictional relationship and relatively rigid connection with the and male connector assembly 470.

For purposes of simplicity, and without conceding novelty of any of the structures or combination of structures described herein, it is to be understood that reference numeral 230 refers to any type of down hole power cable that comprises insulated conductive wires encapsulated protective tubing, including without limitation motor lead extension cables 160, main power cables 170, and insulated conductive wires protected by triskelion sheathing.

An electrical connection is formed between the conductive wire 231 and conductor pin 550. The insulated conductive wire 231 preferably extends past top stop 510 and into a recess 552 in conductor pin 550. The conductor pin 550 is positioned within the male connector assembly 470 so that its top portion contacts the bottom portion of the insulation 232. Top stop 510 includes two threaded holes 511a and 511b for receiving threaded screws 452a and 452b. Protective outer sheath 450 includes holes 451a and 451b aligning with threaded holes 511a and 511b for receiving screws 452a and 452b. In this manner, screws 452a and 452b fasten the protective outer sheath 450 to the top stop 510.

Stop bushing 580 is preferably inserted into counter bore 512 of top stop 510 to a position between the tubing 233 and top stop 510. Stop bushing 510 is oriented to substantially contact a portion of the tubing 233 within the top stop 580 so that a tight seal is formed. Adjacent to the stop bushing 580, the conductor bushing 560 preferably surrounds a portion of the insulation 232 protruding from protective tubing 233. While a variety of different types sizes of down hole insulated conductive wires in protective tubing 230 exist, such as for example the tubing used in triskelion leg sheathing 430, the top stop 510 is preferably only one size. For convenience, therefore, field personnel carry a plurality of ring-shaped stop bushings 580 and conductor bushings 560, each having a fixed external diameter to fit within top stop 510, and different incremental sizes of the internal diameter to match the size of the insulated conductive wire in protective tubing 230. After insertion of the proper sized bushings 580 and 560, screws 452a and 452b are tightened against stop bushing 580 to male assembly 470. Although fluid may pass into connector 150, screws 452a and 452b, together with the friction fitted bushings 584, 540, tighten the protective outer sheath 450 the connector 150 substantially thus sealing the male connector 470 from elements in the well.

Insulated conductive wire 232 extends past conductor bushing 560 into a passage in male boot 530. Washer 520, is optionally inserted above male boot 530 to provide a mechanical divider between the male boot 530 and the conductive bushing 560 and the top stop 510. Below washer 520, a portion of insulation 232 is trimmed off so that conductive wire 231 is exposed. The exposed portion of conductive wire 231 is inserted into the recess 552 of conductor pin 550, which is adapted for receiving and electrically and mechanically connecting conductive wire 231 with copper pin 550. The passage in male boot 530 has a diameter slightly smaller than the diameter of the insulated conductive wire in protective tubing 230 so that, when inserted in the opening, the insulated conductive wire 231 and copper pin 550 are held in contact with each other. Male boot 530 is preferably constructed of rubber, or any other suitable material for providing electrical insulation between the conductive elements of the connector and protective outer sheath 450.

Male boot 530 extends from below washer 520 and/or tap stop 510 down a portion of conductor pin 550 so that both insulated conductive wire 231 a substantial portion of copper pin 550 are surrounded. An annular protrusion 531 extends in parallel with the longitudinal axis of male boot 530 to define a portion of the bottom surface of the male boot 530. The annular protrusion 531 surrounds only a portion of the conductor pin 550 so that the tip of the conductor pin 550 exposed. It will be understood that the aforementioned parts describe any one of the male connector assemblies 470a, 470b, 470c described in FIGS. 4A and 4B, and that additional connectors, if needed, would include similar parts.

The female connector assembly 460 shown in FIG. 5, preferably comprises rubber boot 540 and socket 590 for slidably receiving tip 551 of copper pin 550. The annular protrusion 531 of male boot 530 slidably grips the annular channel 541 of female boot 540. Female boot 540 is formed to surround and support the insulation 232 of conductive wire 231, the stand off 570, and the socket 590, so that the end surface 591 of socket 590 contacts the stand off 570.

Socket 590 is preferably defined with a male recess 592a on the upper portion of socket 590 for receiving the tip 551 of the conductor pin 550. The lower portion of socket 590 is preferably defined by a female recess 592b adapted for receiving conductor wire 231. Optionally, socket 590 is compressed slightly thus applying inward gripping force on conductor wire 231 to maintain contact between socket 590 and conductor wire 231. Alternatively, socket 590 is replaced with a crimper or lug as described in FIG. 12.

The male and female boots 470, 460 are preferably formed to fill annular space between the electrically conductive elements and the protective outer sheath 450. The protective outer sheath 450 is thus electrically isolated from the conductive portions of the male and female connectors 460 and 470.

The diameter of insulated conductive wire in protective tubing 230 is preferably slightly larger than the diameter of socket 590. Conductor pin 550 and female conductive wire 231 are formed of any suitable electric conducting material such as copper, or the like, and each is formed by a plurality of longitudinally extending portions which are configured to axially align and mate. Male conductor pin 550 and the female conductor wire 231 electrically connect thereby connecting one of the insulated conductive wires 231 of the down hole electrical equipment 180 to main power cable 170.

The stand off 570, preferably having a larger diameter than socket 590, is placed within rubber female boot 540 in contact with end portions of insulation 232 and tubing 233. Stand off 570 is also preferably formed of a reinforced, high voltage, high strength insulator material, such as Westinghouse G-10, for example. Stand off 570 includes a hole 570a having a diameter that surrounds insulation 232, and a second, larger diameter hole 570b, counter bored to extend part way over protective tubing 233 to preferably create a tight fit. The second hole 570b also forms an extension lip for circumscribing and engaging the end of the protective tubing 233.

The lower end of the female assembly 460 comprises a top fitting assembly 1000, which preferably includes a two piece compression assembly 1010 (a ferrule 1011 and a compression nut 1012) and top stop 1020 formed with a threaded extension 1022. The top fitting assembly 1000 is further described in FIG. 10. Although FIG. 10 includes a lower and upper top fitting assembly 1000, each assembly 1000 has substantially similar parts to the top fitting assembly in FIG. 5. It is to be understood therefore that the top fitting assembly 1000 is employed in both male and female connector assemblies 460 and 470, if needed.

Figure 6:
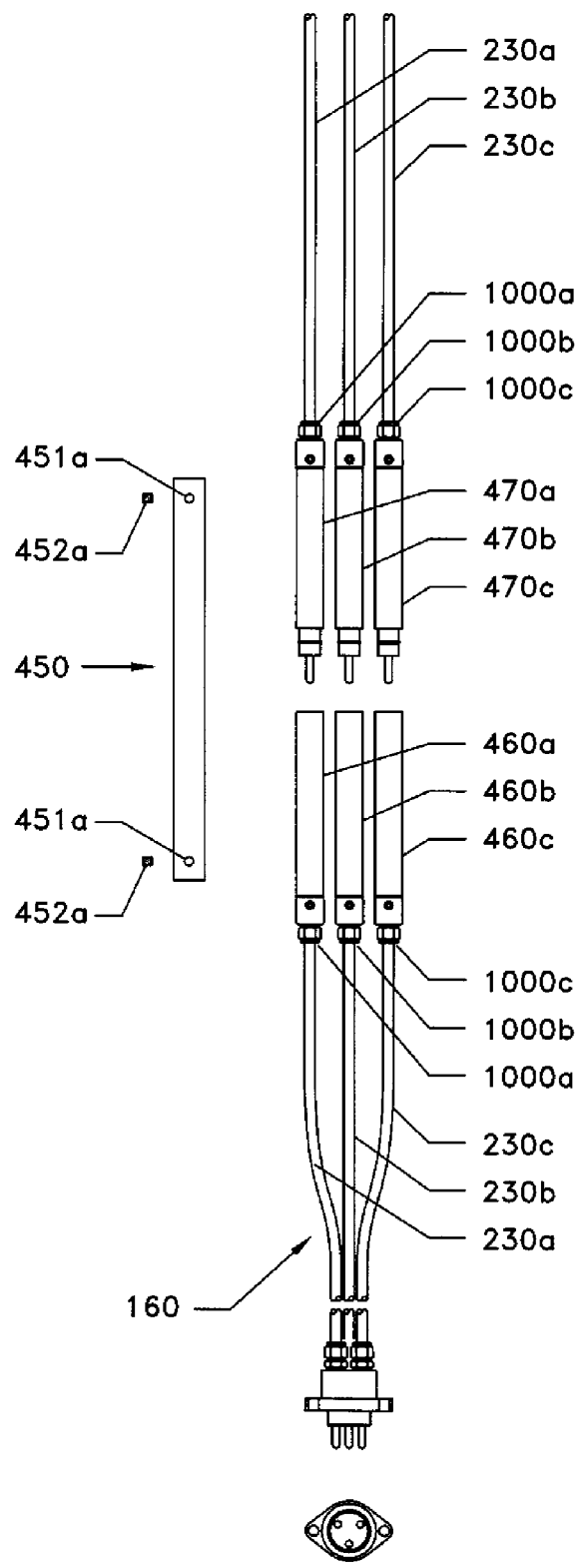
FIG. 6 shows example embodiments of male connector assemblies attached to encapsulated insulated conductive wires in protective tubing and example embodiments of female connector assemblies attached to a motor lead extension cable.

For example, in FIG. 6 shows the top fitting assembly 1000 employed in both the male and female connector assemblies 470, 460. That is top fitting assemblies 1100a, 1100b, 1100c securely attach the male connector assemblies 470a, 470b, 470c to the insulated conductive wires in protective tubing to 230a, 230b, 230c. Separate top fitting assemblies 1000a, 1000b, 1000c also attach the female connector assemblies 460a, 460b, 460c, to a motor lead extension cable 160 with three insulated wires in protective tubing 230a, 230b, 230c. The male and female connectors assemblies 470, 460 shown in FIG. 6 can also be selectively plugged in, or unplugged by the operator to connect and disconnect flow of electrical power down hole. Protective outer sheath 450, adjacent to the male and female assemblies 470, 460, slidably covers the male and female assemblies 470, 460 when they are plugged together screws 452a are inserted in holes 451a and tightened the top assemblies 1000. Although only one protective outer sheath 450 is shown, it is understood that additional protective sheaths may be used, if needed.

Figure 7:
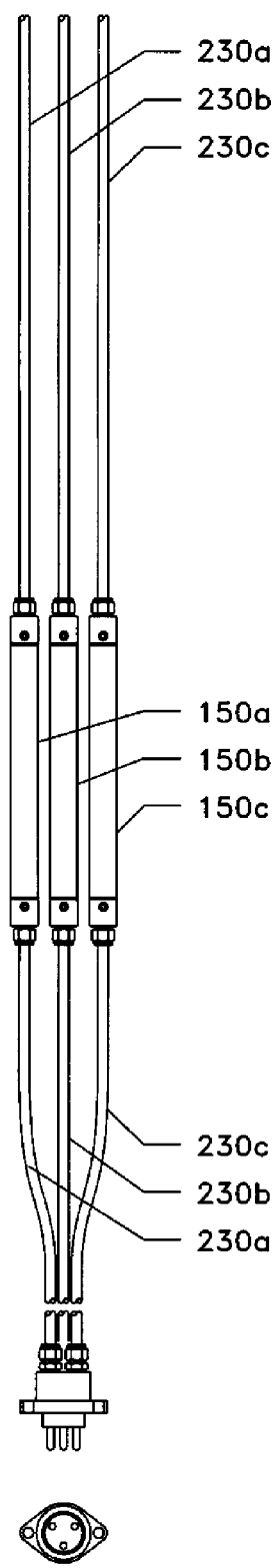
FIG. 7 shows an example embodiment of permanent connectors each being covered by a protective outer sheath.

FIG. 7 illustrates another embodiment in which permanent connectors 150a, 150b, 150c are used to connect the motor lead extension cable 160 made with insulated conductive wires in protective tubing 230a, 230b, 230c. The permanent connectors 150a, 150b, 150c of FIG. 7 provide a mechanical and electrical connection between the lower insulated conductive wires in protective tubing 230a, 230b, 230c from the motor lead extension cable 160 and the upper encapsulated wires in protective tubing 230a, 230b, 230c. The permanent connectors 150a, 150b, 150c do not easily uncouple and they cannot be plugged and unplugged. A detailed cross section of the permanent connectors 150a, 150b, 150c of FIG. 7 are shown as example embodiments in FIGS. 10 and 11.

Figure 8:
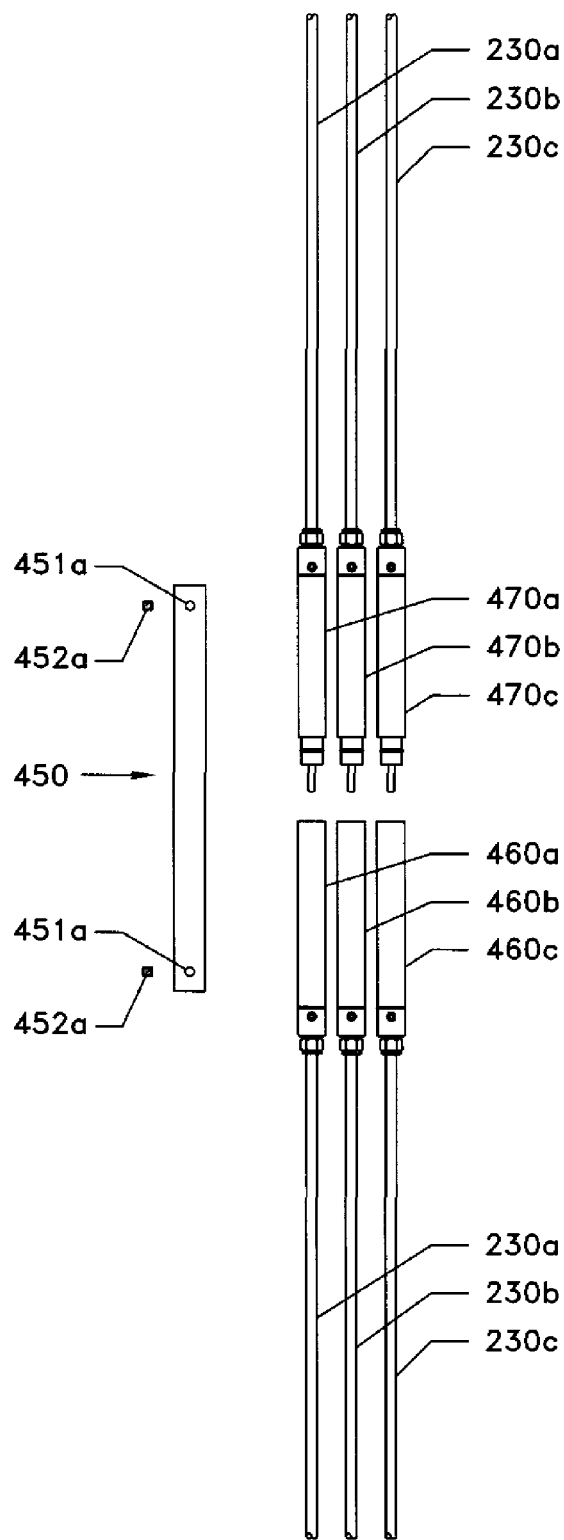
FIG. 8 shows example embodiments of male connector assemblies attached to insulated conductive wires in protective tubing and example embodiment, of female connector assemblies attached to encapsulated insulated conductive wires in protective tubing.

FIG. 8 shows another embodiment of plugable male and female connector assemblies 470, 460. In this embodiment, the male connectors 470a, 470b, 470c are attached to an upper set of insulated conductor wires in protective tubing 230a, 230b, 230c and the female connector assemblies 460a, 460b, 460c are attached to a lower set of insulated conductor wires in protective tubing 230a, 230b, 230c. The male and female connector assemblies 470, 460 can be selectively plugged and unplugged by the operator, and one or more outer protective sheaths 450 can also be attached to cover each of the connectors in order to mechanically secure the connectors.

Figure 9:
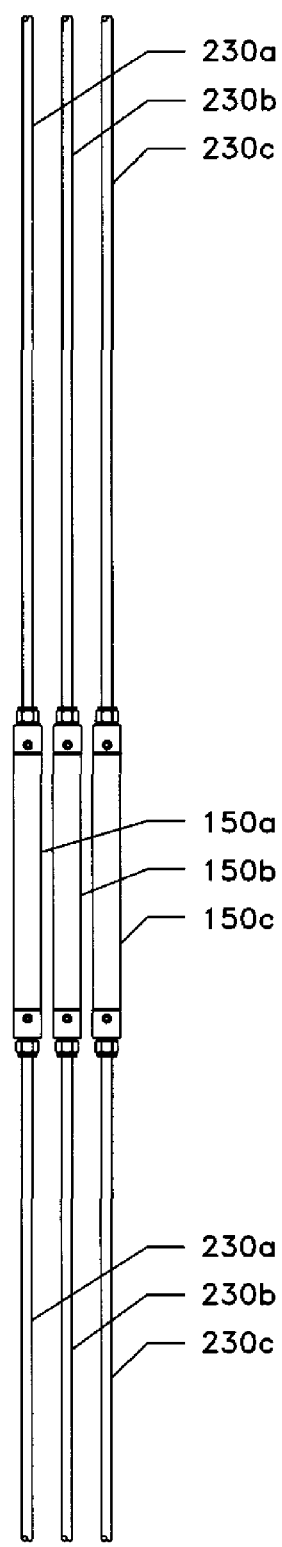
FIG. 9 shows another example embodiment of permanent connectors, each being covered by a protective outer sheath and attached to insulated conductive wires in protective tubing.

FIG. 9 shows another embodiment of the present invention in which permanent connectors 150a, 150b, 150c have been attached to upper and lower insulated conductive wires in protective tubing 230a, 230b, 230c. The illustrated embodiment cannot be plugged or unplugged by the operator. A detailed cross section of embodiments of the permanent connectors 150a, 150b, 150c are shown in FIGS. 10 and 11.

Figure 10:
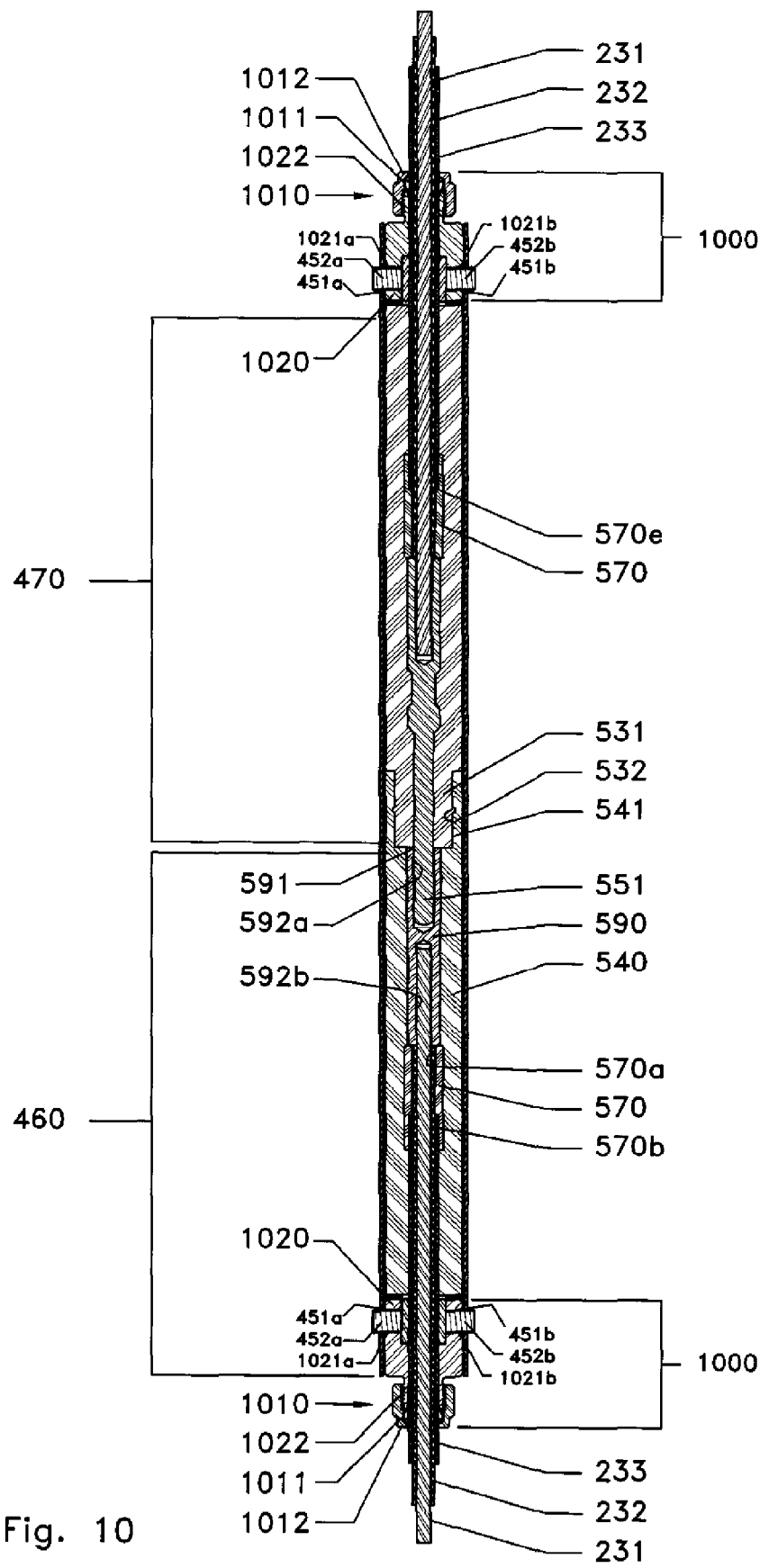
FIG. 10 shows a sectional view of another example embodiment of one of the male and female connector assemblies.
Figure 11:
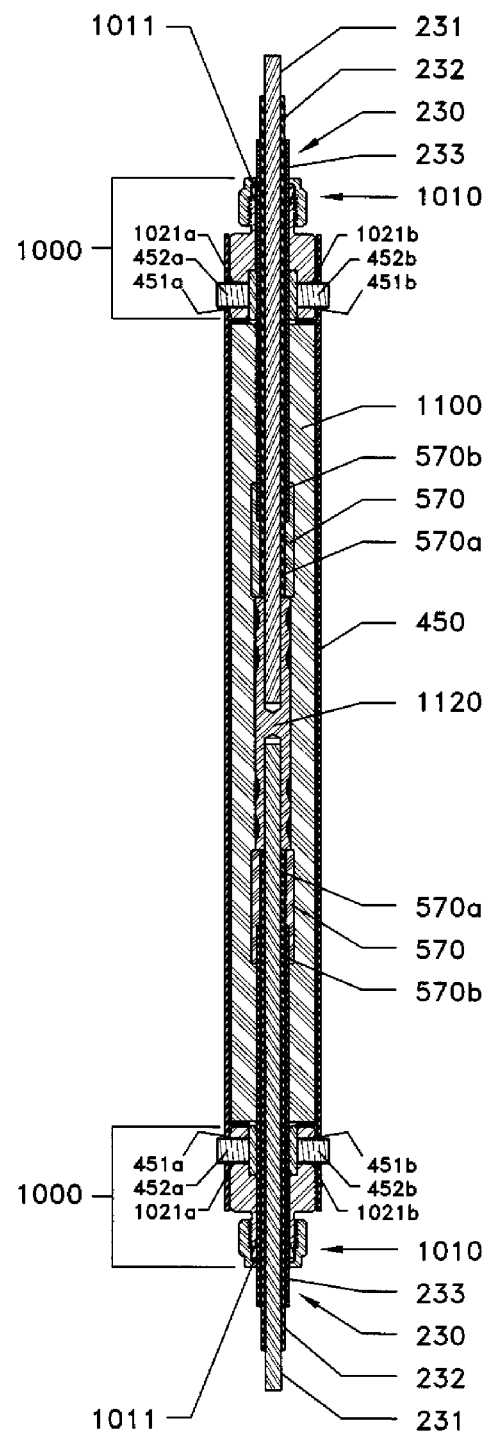
FIG. 11 shows a sectional view of an example embodiment of a connector with a single-piece rubber boot and crimp splice.
Figure 12:
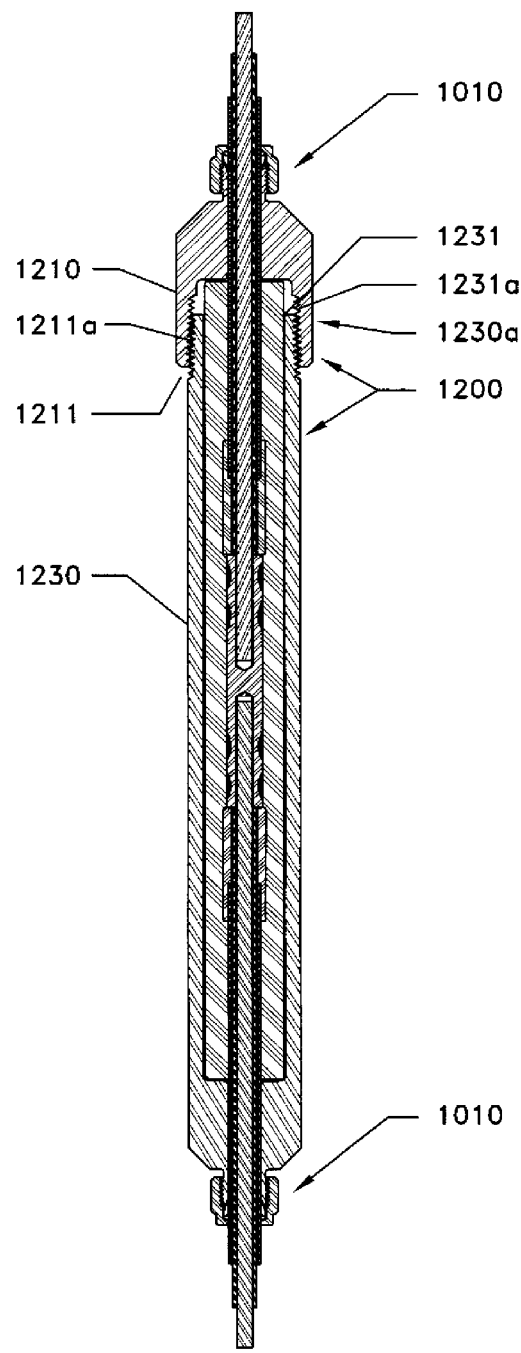
FIG. 12 shows a sectional view of an example embodiment of a connector that employs a unitary protective casing.

Reference is now made to FIG. 10, in which like parts from FIGS. 5, 11, and 12 are identified with like numerals. In FIG. 10, two top fitting assemblies 1000, which are each preferably a two-piece compression assembly 1010 (a ferrule 1011 and a compression nut 1012), and top stop 1020 secure end portions of the insulated conductive wires in protective tubing 230 to the connector 150.

The compression assembly 1010 preferably provides a close fit with a relatively tight tolerance around tubing 233. The compression assembly 1010 is preferably tightened to the tubing 233 to form a fluid seal. When compression nut 1012 is tightened, it clamps-down on ferrule 1011, causing it to conform to the circumference of the protective tubing 233. This clamping effect on protective tubing by top fitting 1000 substantially stops fluid flow from the well bore into male and female connector assemblies 460, 470. The compression assembly 1020 can be field attached to the ends of each insulated conductive wire in protective tubing 230.

Protective outer sleeve 450, preferably comprising a hollow cylindrical tube made of a non-ferromagnetic electrically conductive material, such as stainless steel, for example, forms a protective shield circumscribing the connector. As shown in FIG. 10 and as previously noted, protective outer sleeve 450 includes holes 451a and 451b for receiving screws 452a and 452b. Top stop 1020 includes corresponding threaded holes 1021a and 1021b for receiving screw 452a and 452b, respectively. In this manner, protective outer sleeve 450 is slid around top stop 1010 so that the holes 451a and 451b and 1021a and 1021b are aligned respectively, and screws 452a and 452b can be screwed into the threaded holes 1021a and 1021b through hole 451a and 451b of the outer sleeve 450 and tightened to the protective tubing 450. Outer sleeve 450 is thus fixedly attached to both top stop assemblies 1000.

It will be appreciated that connectors 150 provide an effective seal preventing fluid from freely entering the connections, and that such connections remain intact during pressurization and depressurization occurrences in the well. It will be further appreciated that the top stop assemblies 1000 attach to protective outer sheath 450 in a manner which confines the male 470 and female 460 connector assembly and prevents them from expanding. Stand off 570 includes a shoulder 570e formed around the tubing 233 of the insulated conductive wire 230 prevent fluid leakage.

The connector 150 embodiments described in FIGS. 5 and 10 show male and female connector assemblies 470, 460 that can be plugged and unplugged. As described above, a protective outer sleeves 450 can be selectively fitted over each of the male and female connector assemblies 460, 470 as desired by the operator to electrically and mechanically connect power cables. In another embodiment, power cables are permanently connected so that the conductive wires 231 inside the connected cables cannot be easily disconnected.

FIG. 11 shows an embodiment of a permanent connector 150 in a sectional side view. Although only one of the connections of connector 150 is shown, it is understood that similar connections and apparatus are used for additional connections in this embodiment. Upper and lower portions of the permanent connector 150 embodiment include substantially identical parts, including the top fitting assembly 1000, a crimp 1120 and stand off 570. Reference is made to such parts, with the understanding that like parts are identified with like reference numerals in other figures. Use of substantially identical parts in upper and lower portions of permanent connector 150 make this embodiment a cost effective alternative, particularly useful in one time use situations. This embodiment is also desirable for reinforcing weak points between the surface power source and down hole equipment, resulting in less risk of connection failure.

In this embodiment, the connection preferably connects adjacent insulated conductive wires in protective tubing 230, such as described above for motor lead extension cable 160. The top fitting assemblies 1000 shown in FIG. 11 are substantially identical to the top fitting assembly 1000 described in FIGS. 5 and 10. Within the protective outer sheath 450, a single-piece boot 1100 provides electrical insulation and surrounds crimp 1120 which preferably attaches the two conductive wires 231. The protective outer sheath 450 is fastened to the top fitting assembly 1000 for covering and sealing the connection in this embodiment. As in FIGS. 5 and 11, the upper and lower top fitting assemblies 1000 are formed with a compression assembly 1010 including a compression nut 1012 that, when tightened against threaded extension 1022 formed on top stop 1020, compresses a ferrule 1011 against the tubing 233 to create a tight seal. The top stops 1020 include threaded holes 1021a and 1021b which align with upper and lower holes 451a and 451b so that screws 452a and 452b can be inserted and tightened to secure protective outer sheath 450 against the top fitting assemblies 1000.

Referring to FIG. 11, encapsulated insulated conductive wires 230 extend through top fitting 1000 and into a portion of single-piece boot 1100, where each wire is engaged by stand off 570. Stand off 570 preferably has a larger diameter than crimp 1120 and comprises a reinforced, high voltage, high strength insulator material. A passage way through the longitudinal axis of stand off 570 has a diameter adapted to tightly surround the insulation 232 layer. Positioned properly, end surfaces of insulation 232 align with end portions of stand off 570 providing a flush surface to contact the crimp 1120.

Stand off 570 has larger stepped internal hole 570b with having a greater diameter than the other 570a. The greater diameter hole 570b extends part way over the tubing 233, and is formed to shoulder against the tubing 233, allowing insulation 232 and conductive wire 231 to pass into the lesser diameter hole 570a of stand off 570 to preferably create a tight fit. Circumscribing tubing 232, the greater diameter end 570a surrounds a portion insulation 232 and tubing 232 and abuts with crimp 1120.

Crimp 1120 couples with upper and lower conductive wires 231 mechanically and electrically connecting the two wires. Crimp 1120 attaches to each wire 231 upon lateral compression of its side portions, which permanently deforms crimp 1120 to creating a close fit between the crimp 1120 and the conductive wire 231. Fitted around the circumference of the wires 231, crimp 1120 provides a permanent frictional engagement between the two wires. Crimp 1120 is formed of any suitable electric conducting material such as copper, or the like, and can be deformed to provide a rigid connection means.

Stand off 570 and crimp 1120 preferably have a slightly larger diameter than single-piece boot 1100. Boot 1100, preferably comprising rubber, is formed to surround and support the insulated conductive wire in protective tubing 230, stand off 570 and crimp 1120 for electrically isolating the conducting portions from the protective outer sleeve 450. The single-piece boot 1100 preferably includes a longitudinal passage through which the aforementioned parts pass and mate.

In FIGS. 5, 10 and 11, the well fluids can enter the connector 150 due to the high pressure in the well, and as result the male and female boots 530, 540 or single-piece boot 1100 typically become saturated with well fluids. When the down hole pump is turned on, it pumps fluid up the production tubing 210 typically creating the a relatively depressurized well environment. The fluid impregnated boots 530, 540, 1100 can not release the fluid fast enough, so that a pressure differential exists between the inside of the connector and the surrounding depressurized well area. The rubber of boots 530, 540, 1100 therefore tend to expand. This forces the male and female boots 530, 540 apart. This pressure differential also forces the single piece boot 1100 to expand against top fitting assemblies 1000. Due to the top fitting assemblies 1000, and the outer protective sleeve, the rubber boots 534, 540, 1110 are confined and can not readily expand so the connector remains intact. Further, because top fitting assembly 1000 is fixedly attached to the tubing 233, the insulated conductive wires in protective tubing 230 are not forced out of the connector.

FIG. 12, shows an embodiment of the connector 150 which is impervious to well fluids. The impervious connector 150 preferably includes a protective outer casing 1200 having an end cap 1210 and tubular body 1230. The end cap 1210 and tubular body are each formed with a compression assembly 1010 as shown in other figures. The end cap 1210 and tubular body 1230 mate to form the protective casing 1200 and, in doing so, form a hollow cylindrical tube, made of a non-ferromagnetic electrically conductive material, such as stainless steel.

End cap 1210 has an opening 1211 with internal threads 1211*a*, defined by a continuous helical channel on a portion of its internal surface, which is adapted to couple with tubular body 1230. Tubular body 1230 has complementary opening 1231 with external threads 1231*a* defined by a continuous helical rib around the circumference of a portion of the outer surface 1230*a*. The threaded portions 1211*a* and 1231*a* of end cap 1210 and tubular body 1230 screw together creating a metal-to-metal seal thus unitarily forming the protective casing 1200.

Figure 12A:
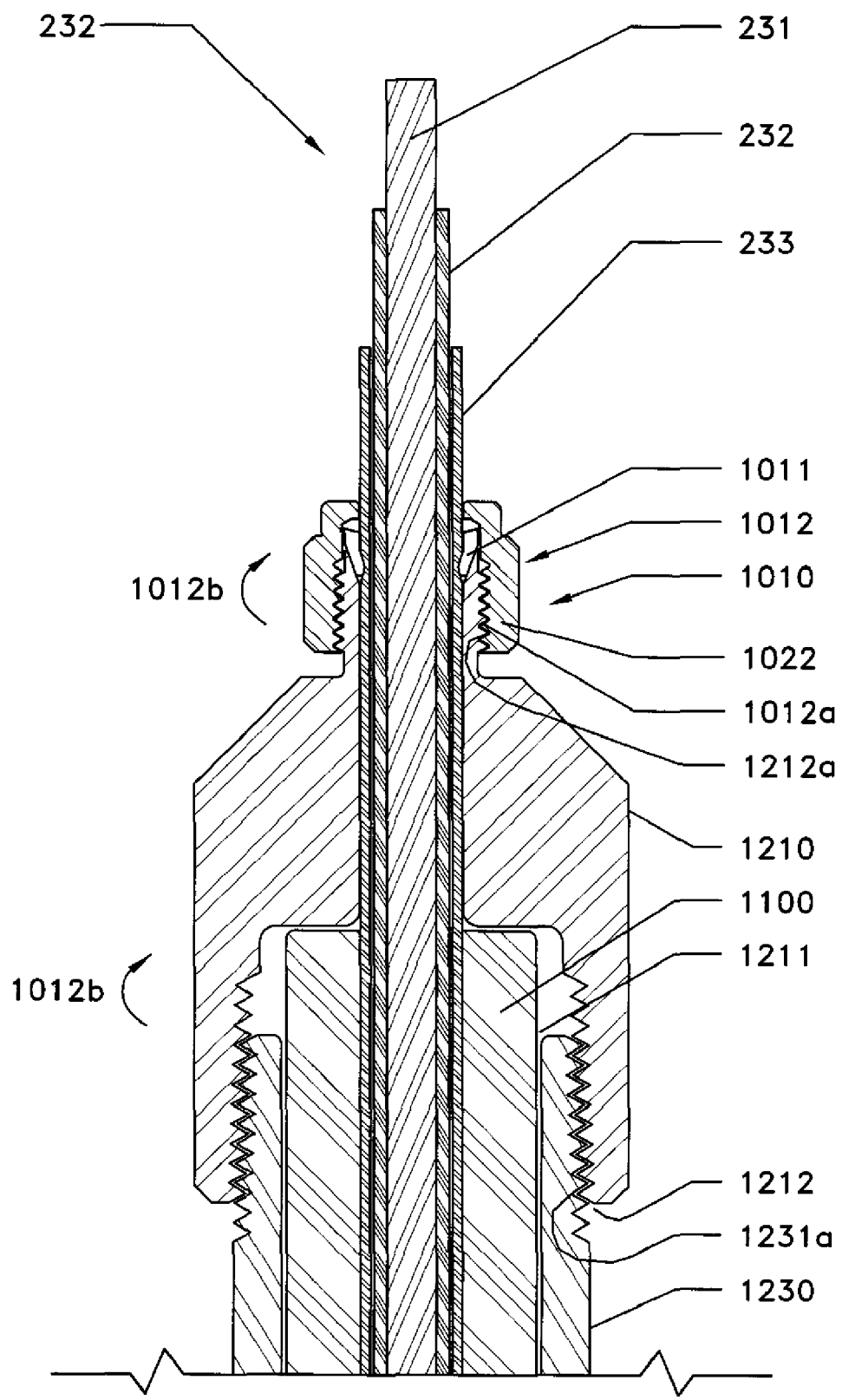
FIGS. 12A-12C show detailed sectional views of the connectors described in FIG. 12.

FIG. 12A shows a detailed cross section view of end cap 1210 coupled to tubular body 1230. Internal threads 1211*a* of end cap 1210 and external threads 1231*a* of tubular body 1230, when tightened together, provide a metal-to-metal seal locking out elements in the well including fluids, gas, oil and other liquids. For example, fluid and other elements in the well preferably cannot pass between end cap 1210 and tubular body 1230 to come in contact with the single-piece rubber boot 1100. The single-piece rubber boot 1100, preferably comprising EPDM rubber (ethylene propylene diene monomer rubber), provides an elastomeric material for insulating high-voltage electrical connections. The single-piece boot 1100 is preferably compressed and temporarily deformed as end cap 1210 is screwed to tubular body 1230 causing portions of the single-piece boot 1100 to expand into annular empty space within protective outer casing 1200. Preferably, all air pockets are eliminated within the tightened connector 150. The compressed single-piece rubber boot 1100 provides additional gripping force on crimp 1120, stand off 570, and enclosed portions of the insulated conductive wire in protective tubing 230 so that the encapsulated insulated conductive wires 230 cannot be pulled out of the connection.

Compression assembly 1010, formed to mate with end cap 1210, also secure the insulated conductive wires in protective tubing 230 within the protective casing 1200 to prevent them from being pulled out of the connector 150. Compression assembly 1010, preferably the previously described two-piece fitting, includes a ferrule 1011 and a compression nut 1012. The compression nut 1012 is formed with internal threads 1012*a*, defined by a continuous helical channel formed on the internal surface.

The compression assembly 1010 is actuated. Compression occurs by tightening compression nut 1012 to threaded extension 1022 so that the ferrule 1011 pushes against the compression nut 1012 and tubing 233. The ferrule 1011, preferably a metal, brass or copper ring, is designed to slide over the encapsulated insulated conductive tubing 233 making contact with its outer surface. When compression nut 1012 is tightened, it clamps-down on ferrule 1011, causing ferrule 1011 to deform slightly and conform to the circumference of the encapsulated insulated conductive tubing 230. Alternatively, ferrule 1011 is rigid thus deforming slightly the protective tubing 233 when tightened. Ferrules 1011 vary in shape and material according to the protective tubing. Preferably, the ferrule 1011 is oriented so that its longest sloping face contacts protective tubing 233 and faces away from compression nut 1012.

End cap 1110 is preferably formed with a threaded extension 1012, having external threads 1212*a* defined by a continuous helical rib around the circumference of the extension 1212. The threaded extension 1212 protrudes from end cap 1210 so that compression nut 1012 can be screwed on. As compression nut 1012 is screwed on, its internal threads 1012*a* mate with complementary external threads 1212*a* of the threaded extension 1212 of the end cap 1210 thus creating a tight seal between tubing 233 and compression assembly, 1010. The tight seal is impervious to elements in the well, and provides a mechanical coupling that locks the end cap 1210 to the encapsulated insulated conductive wire 230 preventing the single-piece boot 1100 from moving within the protective outer casing 1200.

Figure 12B:
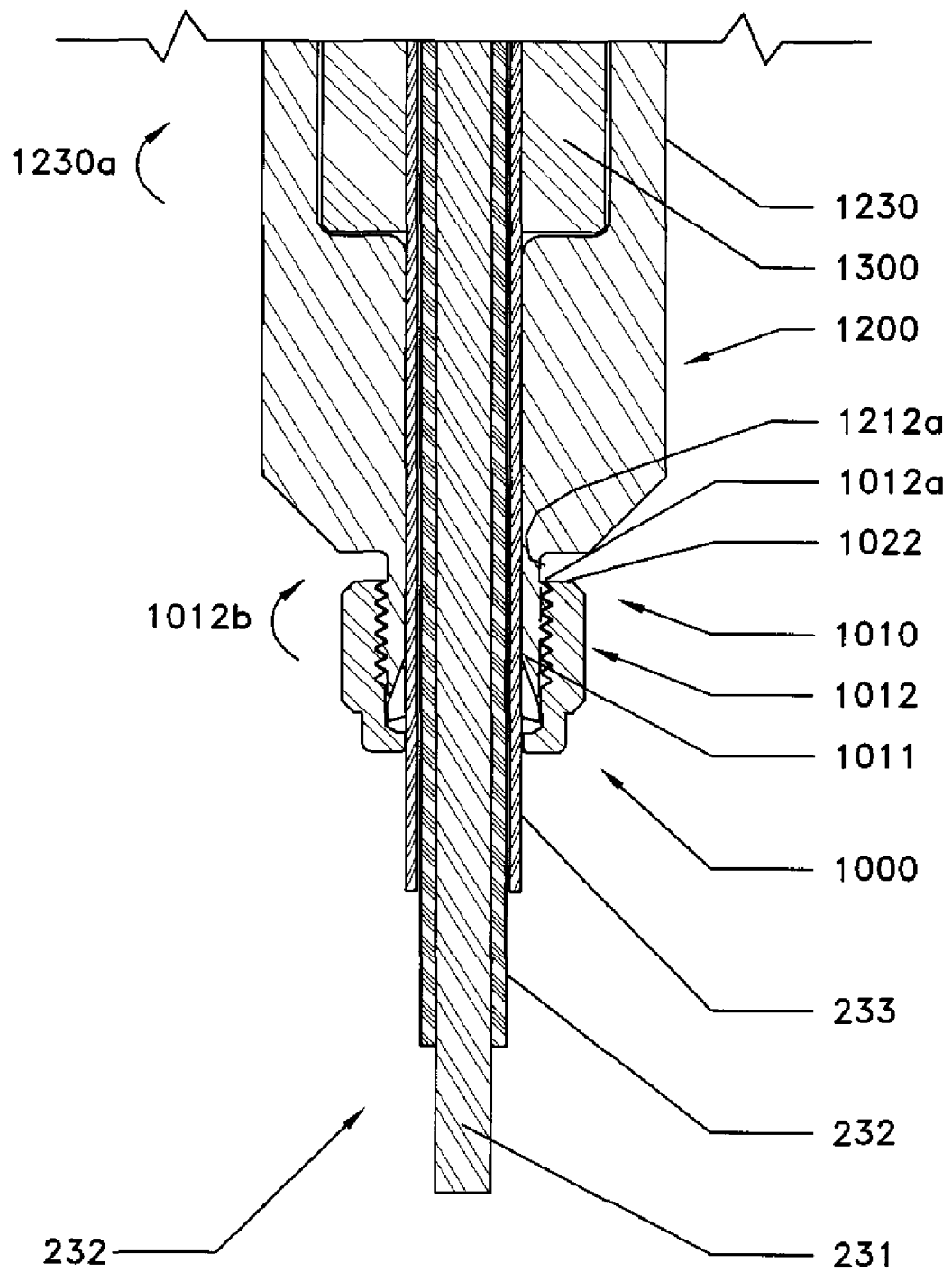

Referring to FIG. 12B, in a cross section view of the bottom portion of tubular body 1230, a compression assembly 1010 joins the insulated conductive wire 233 in protective tubing 230 with the connector 150. Tubular body 1230 is preferably formed with a threaded extension 1232 having external threads 1232*a* designed to interface with the internal threads 1012*a* of the compression nut 1012. As described above, compression assembly 1010 tightens to the insulated conductive wire in protective tubing 230 in order to create a tight seal locking out elements in the well and mechanically attaching to the protective tubing 233.

In alternative embodiments, seal between the end cap 1210 and tubular body 1230 includes an O-ring. Other types of threading may also be suitable such as a pipe thread, strait thread, or other type of thread known by those of skill in the art. Alternatively, the tubular body 1230, end cap 1210 and upper and lower compression assemblies 1010 are welded together.

Figure 12C:
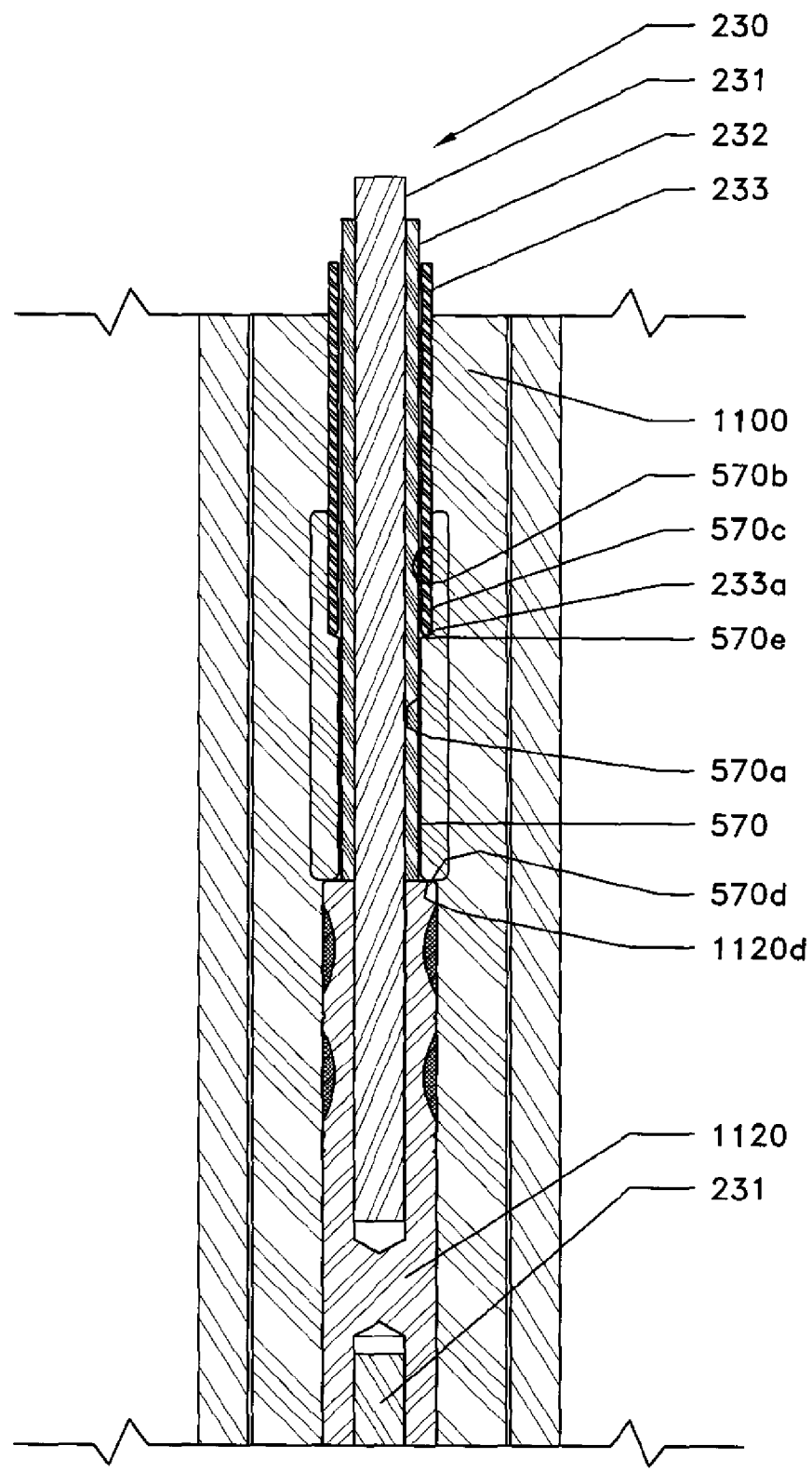

FIG. 12C shows a detailed partial sectional view of the single-piece rubber boot 1100, stand off 570, and crimp 1120. As illustrated, stand off 570 preferably has a larger diameter than the crimp 1120 for proper placement within the single-piece boot 1100. Stand off 570 is preferably formed of a reinforced, high voltage, high strength insulator material, such as for example, a glass-filled material or Westinghouse G-10. Stand off 570 has a lesser diameter hole 570a on one end for surrounding the insulation 232 of the conductor wire 231, and a second, greater diameter hole 570b on the opposite end extending part way into the stand off 570 for surrounding the tubing 233. The greater diameter hole 570b is counter bored to slidably receive the tube 233 and preferably create a tight fit. The greater diameter hole 570b also forms an extension lip 570c for circumscribing the protective tubing 233, and a shoulder 570e for engaging the end of tubing 233. In spite of the high pressure in the well, the single-piece rubber boot 1100 may extend slightly between the extension lip 570c and the protective tubing 233, but will not penetrate all the way to the shoulder 570e. In fact, due to the inward pressure applied by the surrounding single-piece boot 1100, the end 233a of the protective tubing 233 is forced into the shoulder 570e forming an effective fluid seal. To form a tight seal, the stand off 570 has a relatively wide and flat annular face 570d around the lesser diameter hole 570a for engaging the end of crimp 1220, which also has a relatively wide and flat annular face 1120d around its recessed portions. External pressure from tightening of the end cap 1210 also forces the crimp 1210 against the stand off 570 increasing the tightness of the seal.

As indicated by the cornered arrow in FIGS. 12A, 12B and 12C, outer surfaces of the compression nut 1022b, end cap 1210a, and tubular body 1230 are adapted to be gripped and rotated about their longitudinal axis. The outer surfaces 1012b, 1210a, 1230a therefore preferably exhibit surface irregularities for providing friction against a rotating devices. For example, outer surface 1012b of nut 1022, may be formed with a plurality of flat faces to be gripped by a crescent wrench so that torque may be applied in a known way. Outer surface 1210a of end cap 1210 and outer surface of 1230a of tubular body 1230 may be similarly formed. In another example, tubular body 1230 may be formed with a relatively smooth surface and adapted to be gripped by a pipe wrench in a known way.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A connector system for electrically and mechanically connecting insulated conductor wires encapsulated in protective tubing with down hole equipment comprising:

A first connector formed with an internal passage and a tube fitting assembly, the internal passage and tube fitting assembly being adapted to selectively engage a conductive wire in protective tubing; wherein the first connector exhibits an elongated longitudinal dimension;

A second connector formed with an internal passage and a tube fitting assembly, the internal passage and tube fitting assembly being adapted to selectively engage a conductive wire in protective tubing; wherein the second connector exhibits an elongated longitudinal dimension, the first and second connectors being adapted to selectively mate; and A protective rigid outer sheath formed with a hollow tubular chamber sized and shaped to slidably receive and engage at least a portion of the first and second connector assemblies, the first and second connector assemblies being longitudinally aligned within the tubular chamber; and Wherein the tube fitting assembly of the first or second connector is shaped to engage a conductive wire encapsulated in protective tubing that supplies power to an electrically powered device within a well bore, Wherein said conductive wire engaged by said tube fitting assembly is fitted with a pothead flange that mechanically and electrically couples with the power receptacle of a device within a well bore; and Wherein the protective tubing encapsulating the conductive wire is sized and shaped to form a continuous protective layer, from about the first or second connector to about the pothead flange, that prevents the conductive wire from coming into contact with well fluids.

2. The connector system of claim 1 wherein the tube fitting assembly of at least one of the first and second connectors comprises an integrally formed longitudinal protrusion having a hollow passage and threaded external portion, the threaded passage adapted to mate with a compression nut having a complementary threaded internal portion and adjacent ring-shaped ferrule, wherein the compression nut is adapted to tighten to the threaded protrusion so that the ferrule is compressed and slightly deformed against the rigid tubing to form a fluid tight seal.

3. The connector system of claim 2 wherein the tube fitting assembly of the first or second connectors comprise an elongated opening sized and shaped to fit around the rigid tube and at least two threaded holes for fastening with the protective rigid outer sheath, the opening including a longitudinal counter bored section for receiving the rigid tubing and at least one ring shaped bushing for engaging the rigid tubing; wherein the threaded holes are adapted to receive a fastening screw so that the protective rigid outer sheath can be tightly attached to the tube fitting assembly.

4. The connector system of claim 1 wherein the conductive wire extends directly from an electrical submersible pump.

5. The connector system of claim 1 where in the conductive wire comprises a portion of a motor lead extension cable.

6. The connector system of claim 1 wherein the conductive wire is not rigid.

7. A connector system for electrically and mechanically connecting insulated conductor wires encapsulated in protective tubing with down hole equipment comprising:

A first connector formed with an internal passage and a tube fitting assembly, wherein the first connector exhibits an elongated longitudinal dimension;

A second connector formed with an internal passage and a tube fitting assembly, wherein the second connector exhibits an elongated longitudinal dimension, the first and second connectors being adapted to selectively mate;

A protective rigid outer sheath formed with a hollow tubular chamber sized and shaped to slidably receive and engage at least a portion of the first and second connector assemblies, the first and second connector assemblies being longitudinally aligned within the tubular chamber;

A first conductive wire encapsulated in protective tubing for supplying power to an electrically powered motor within a well bore, wherein the protective tubing of the conductive wire is adapted to protect the conductive wires from coming into contact with well fluids and is further adapted to be engaged by the first or second connector; and A pothead flange adapted to mechanically and electrically couple with the power receptacle of a motor within a well bore, wherein the pothead flange is connected within the well bore to the first conductive wire in protective tubing.

8. The connector system of claim 7 wherein the first conductive wire encapsulated in protective tubing is sized and shaped to form a continuous protective layer extending from the first or second connector to or near the pothead flange.

* * * * *